United States Patent
Wakefield

(10) Patent No.: US 10,070,637 B2
(45) Date of Patent: Sep. 11, 2018

(54) TWIST CLIP AND METHOD

(71) Applicant: Rick Wakefield, Sheboygan Falls, WI (US)

(72) Inventor: Rick Wakefield, Sheboygan Falls, WI (US)

(*) Notice: Subject to any disclaimer, the term of this patent is extended or adjusted under 35 U.S.C. 154(b) by 108 days.

(21) Appl. No.: 15/365,447

(22) Filed: Nov. 30, 2016

(65) Prior Publication Data

US 2018/0146654 A1    May 31, 2018

(51) Int. Cl.
| | | |
|---|---|---|
| *A01K 91/053* | (2006.01) | |
| *F16B 2/22*   | (2006.01) | |
| *A01K 91/18*  | (2006.01) | |
| *A01K 91/047* | (2006.01) | |

(52) U.S. Cl.
CPC .......... *A01K 91/053* (2013.01); *A01K 91/047* (2013.01); *A01K 91/18* (2013.01); *F16B 2/22* (2013.01)

(58) Field of Classification Search
CPC .... A01K 91/053; A01K 91/047; A01K 91/18; F16B 2/22
See application file for complete search history.

(56) References Cited

U.S. PATENT DOCUMENTS

| | | |
|---|---|---|
| D330,752 S     | 11/1992 | Spickelmire |
| 5,826,365 A    | 10/1998 | Stroobants |
| 6,789,350 B1   | 9/2004  | Link |
| 7,578,092 B2   | 8/2009  | Spickelmire |
| 7,644,534 B2   | 1/2010  | Hagen et al. |
| 2008/0172925 A1 | 7/2008 | Hazel |

*Primary Examiner* — David M Upchurch
(74) *Attorney, Agent, or Firm* — Ryan Kromholz & Manion, S.C.

(57) ABSTRACT

A twist clip and method for use wherein the twist clip includes a body having a rotating clamp head having at least one slot, a stationary clamp head having at least one slot, a core pin, the slots being arranged to retain an elongate object during use.

8 Claims, 4 Drawing Sheets

TWIST CLIP AND METHOD

BACKGROUND OF THE INVENTION

The present invention pertains to releasable clips, and particularly to a clip used to retain elongate articles such as fishing line or the like. Such a clip may be used to retain fishing line used trolling multiple fishing lines from a fishing boat.

When fishing lines are used behind a boat during trolling, the lines have a tendency to move to a path of least resistance, typically directly behind the moving boat. When use of multiple lines is desired, this tendency may create difficulties due to entanglement of the lines drifting together behind the boat. Planer boards are typically used to enable baits to be pulled through the water at locations away from the side of the boat. Planer boards operate to help guide fishing lines laterally outward from the boat, to allow the fisher to utilize more than one line, and to reduce the chance of line entanglement. A fisher may employ several planer boards on either side of the boat and at various distances from the boat to maximize the area being fished.

Generally, a fishing line attaches to a planer board at two points, including a forward tow point and a rearward strike point attached to a baited fishing line. The present clip may be used at such attachment points.

Known clips may have several problems. First, they are often difficult to use or cumbersome to use, particularly when used for fishing with a planer board. The user must reel in the line, the board, and the hooked fish all while the board continues to move across the water. The user may be hindered in quickly removing the board from the line to reel in the fish. This may cause lost fish. Moreover, typical clips may not adequately secure a line. This may cause lost fish or boards. This can be costly and is inefficient.

SUMMARY OF THE INVENTION

The present invention is directed to a twist clip and method for use in multiple applications, including use in conjunction with a mechanical planer board used in fishing. The twist clip is adapted for use in any application that requires an elongate object, such as a fishing line to be quickly and securely retained.

The twist clip includes a body having a rotating clamp head, a stationary clamp head, a core pin, and at least one slot. The slot is arranged to retain an elongate object during use.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
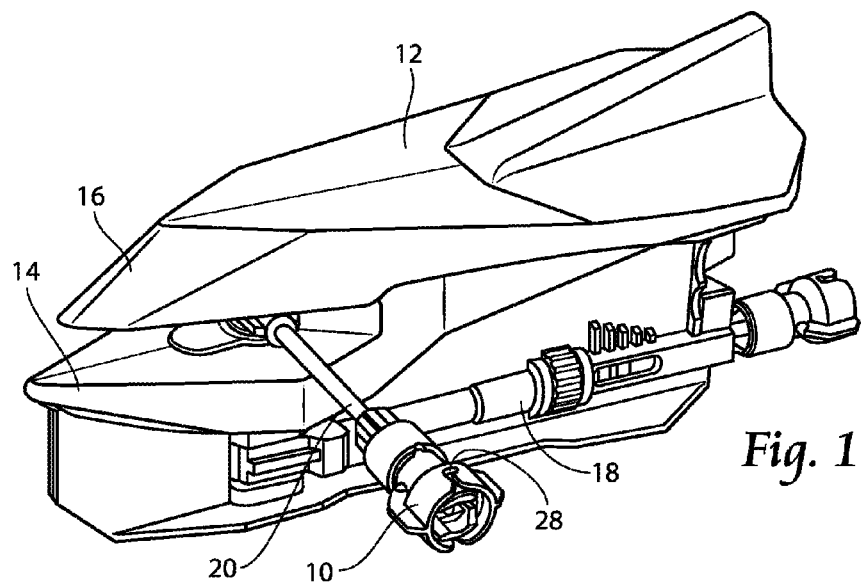
FIG. 1 is a perspective, partial cut away view of a planer board having a twist clip according to the present invention installed on a tow arm.

FIG. 1 illustrates a twist clip 10 according to the present invention and in use in conjunction with a planer board 12 used in fishing. As seen, the board 12 of this view includes a housing 14, a float member 16, an internal assembly 18, and having at least one twist clip 10 supported on a tow arm 20 during use. The twist clip 10 of the present invention is arranged to retain an elongate article, such as the fishing line 22 shown in this view, although it is to be understood that other elongate articles may be retained in other applications outside of the fishing industry. Such applications may include wiring, rope, twine and the like, by way of non-limiting example. Moreover, although this view illustrates the twist clip 10 in conjunction with a planer board 12, it is to be understood that other environments for the twist clip may be envisioned without departing from the invention.

Figure 2:
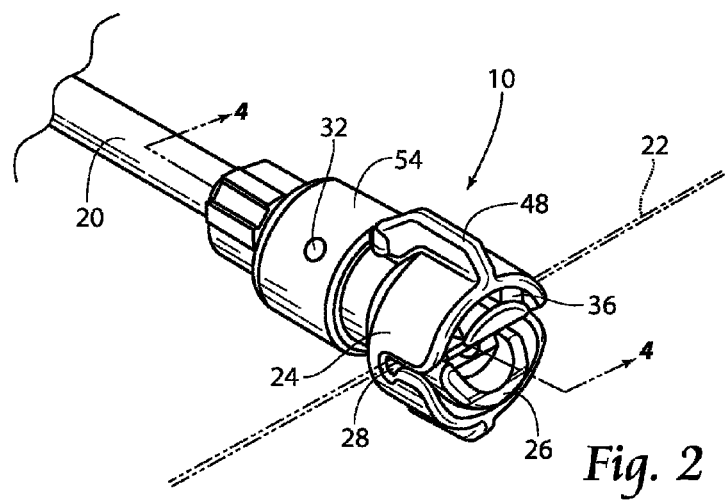
FIG. 2 is a perspective view of the line twist clip illustrated in FIG. 1, and showing the clip in the open position with a line in phantom.
Figure 3:
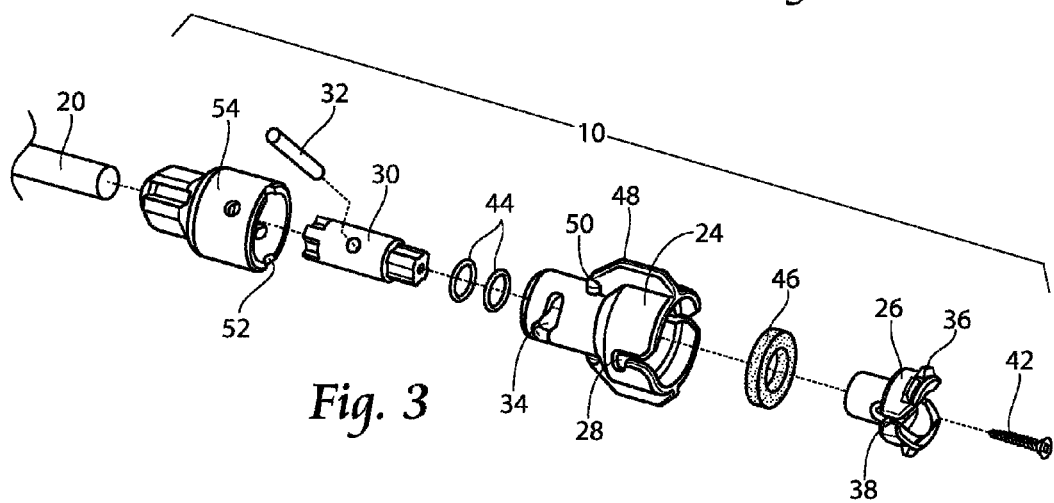
FIG. 3 is an exploded view of the twist clip illustrated in FIGS. 1 and 2.

With attention now to FIGS. 2-10, the twist clip 10 may be viewed. As illustrated, the twist clip 10 may include a rotating clamp head 24 and a stationary clamp head 26 with the rotating clamp head 24 rotatable around the stationary clamp head 26. As seen, the rotating clamp head 24 may include at least one, and preferably two, spaced apart slots 28, with the slots 28 being located across from one another along the rotating clamp head 24 circumference, and being sized and shaped to receive an elongate article, such as the fishing line 22 shown. With particular reference to FIG. 3, it may be seen that the twist clip 10 may include a core pin 30, having a cam follower 32. The cam follower 32 is arranged to ride in a corresponding cam profile 34 on the rotating clamp head 24 (see also FIG. 5).

Figure 4:
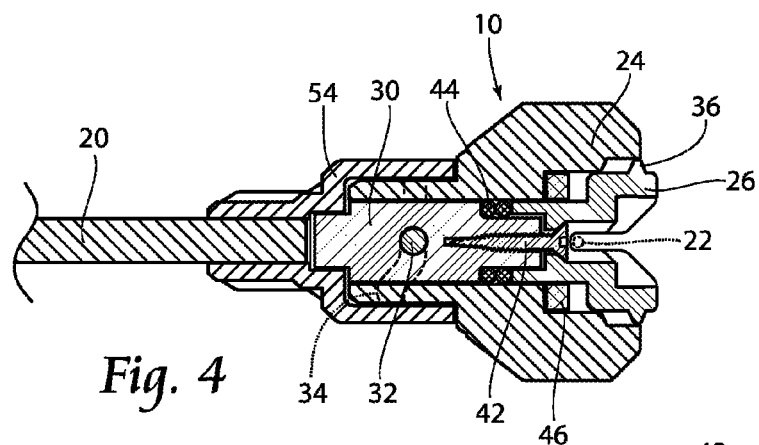
FIG. 4 is a cross sectional view of the clip illustrated in FIG. 2 and taken along lines 4-4 thereof.
Figure 5:
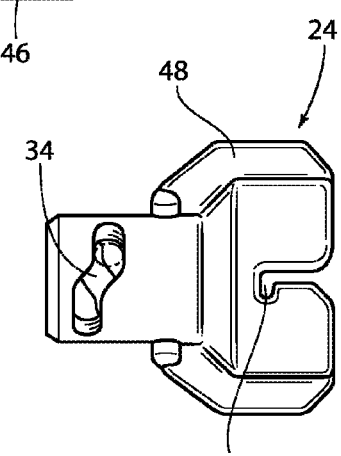
FIG. 5 is a side view of the rotating clamp head and showing a cam profile.
Figure 6:
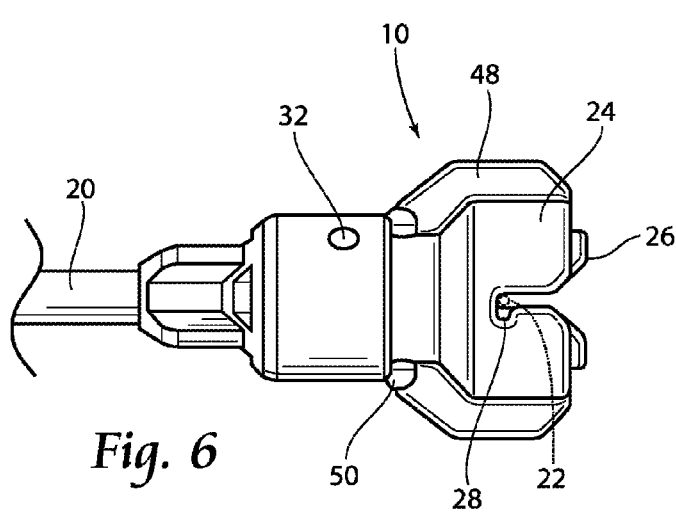
FIG. 6 is a side view of the clip illustrated in FIGS. 1-4.
Figure 7:
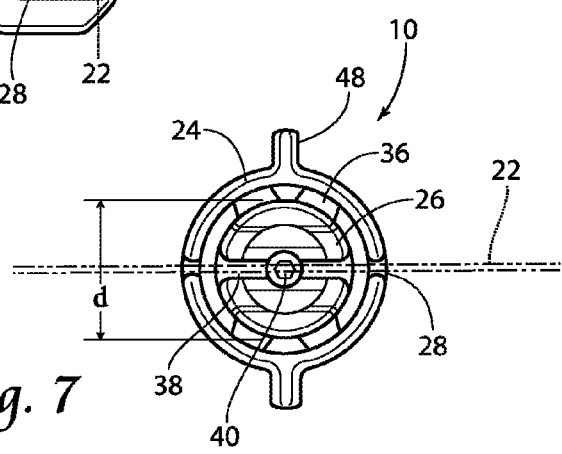
FIG. 7 is an end view of the line clip illustrated in FIGS. 1-4 and showing the clip in the open position.

With regard to the stationary clamp head 26, and as seen in FIGS. 2-4, the stationary clamp head 26 may preferably include protrusions 36 to help retain a line 22 when the twist clip 10 is in the closed position, as will be discussed. Moreover, the stationary clamp head 26 preferably includes at least one slot 38 that runs across a diameter d of the stationary clamp head 26. As seen particularly in FIGS. 7 and 10, the slot 38 is bisected by a clearance hole 40 for an adjustment mechanism, such as the adjustment screw 42 shown. The adjustment screw 42 functions to adjust the clamping force of the clip 10 and further fastens stationary clamp head 26 to the core pin 30. While a screw 42 is illustrated as a preferred adjustment mechanism, it is to be understood that other adjustment mechanisms may be envisioned without departing from the invention. The stationary clamp head 26 is splined to the core pin 30 to prevent rotation between the stationary clamp head 26 and the core pin 30 while allowing for axial slippage between the stationary clamp head 26 and the core pin 30. Axial slippage allows the clamping force of the clip 10 to be adjusted by turning the screw 42. As seen particularly in the exploded view of FIG. 3, the core pin 30 may be provided with a cushioned backing, such as the O-rings 44 shown, to absorb any differential in clip 10 length due to the mentioned axial adjustment. The cushioned backing 44 is provided to interface with the stationary clamp head 26.

FIGS. 2-7 illustrate the twist clip 10 in the open position wherein the slots 28 of the rotating clamp head 24 are aligned with the slot 38 of the stationary clamp head 26, and a line 22 is positioned in the slots 28, 38.

Figure 8:
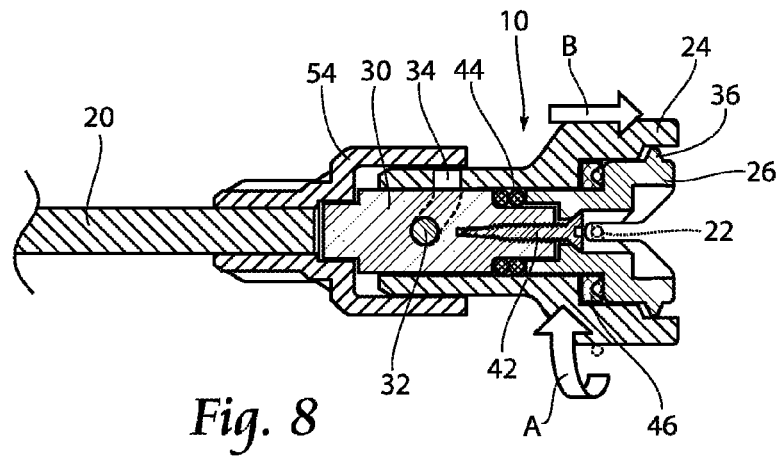
FIG. 8 is a cross sectional view similar to that of FIG. 4, but showing the clip in the closed position.
Figure 9:
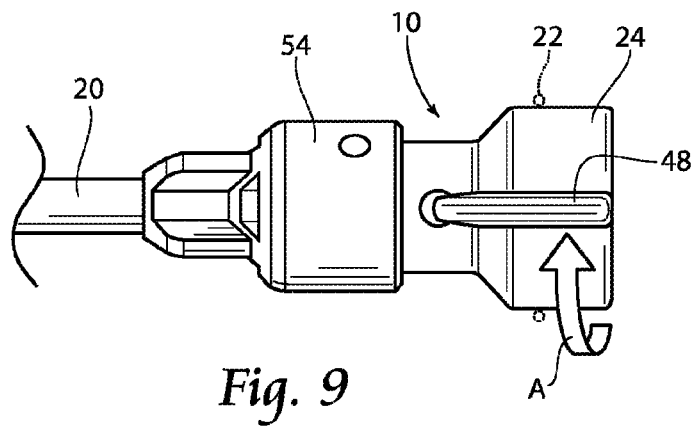
FIG. 9 is a side view of the clip, similar to that of FIG. 6, but showing the clip in the closed position.
Figure 10:
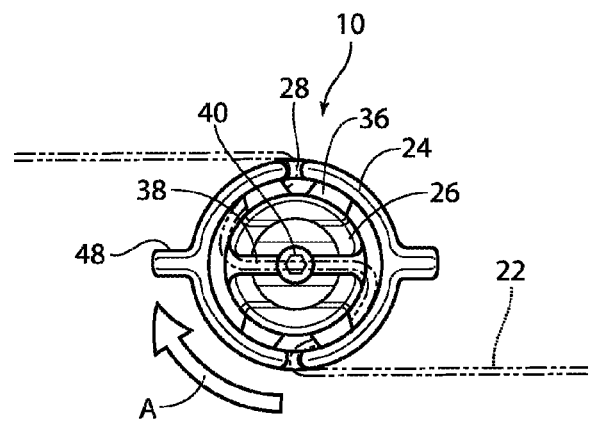
FIG. 10 is an end view of the line clip illustrated in FIGS. 1-4, similar to that of FIG. 7, but showing the clip in the closed position.

With attention to FIGS. 8-10, the twist clip 10 is illustrated with the rotating clamp head 24 rotated approximately 90 degrees in the direction of arrow A, such that the line 22 is captured and threaded around the protrusions 36 of the stationary clamp head 26. As is shown, the line 22 is wrapped around the stationary clamp head 26 in an approximate "S" shape, while the action of the cam follower 32 in the cam profile 34 urges the rotating clamp head 24 in the direction of arrow B and against a friction pad 46. The friction pad 46 aids in retaining the line 22 in the twist clip 10 when the twist clip 10 is in use, for example with the board 12 illustrated in FIG. 1. The friction pad 46 further helps to prevent slippage of the line 22 during use. The rotating clamp head 24 of the clip 10 may be further provided with laterally extending flanges 48 to assist the user during rotation and use. As is best seen in FIG. 3, at least one of the flanges 48 may include an excised portion 50 arranged to engage a corresponding detent 52 in a connector 54, if used. A user may engage the excised portion 50 in a corresponding detent 52 when it is desired to retain the twist clip 10 in an open condition, as is shown in FIGS. 4-7.

FIGS. 8-10 depict the twist clip 10 in the closed position with a line 22 in place and ready for use with the described planer board 12. The rotating clamp head 24 is retained in the closed position by way of frictional contact with the mentioned friction pad 46. Release of the heads 24, 26 is effected by manual rotation of the rotating clamp head 24 in an opposite direction to thereby realign the respective slots 28, 38 to the open position. The twist clip 10 is further adapted for mating engagement with the tow arm 20 shown or other like device, as may be desired. For example, the cam follower 32 on the core pin 30 may further serve to retain the core pin 30 in a connector 54 or other like structure which is adapted to fit multiple applications, such as a tow arm 20 or other structure (not shown).

A method of use may be described as a method of retaining an elongate object 22 including the steps of providing a twist clip 10, the twist clip 10 including a rotating clamp head 24 and a stationary clamp head 26, wherein the rotating clamp head 24 includes at least one slot 28 and the stationary clamp head 26 includes at least one slot 38, the rotating clamp head 24 arranged to rotate around the stationary clamp head 26; providing an elongate object 22; positioning the stationary clamp head 26 and the rotating clamp head 24 such that the at least one slot 38 in the stationary clamp head 26 and the at least one slot 28 in the rotating clamp head 24 are in alignment; inserting the elongate object 22 in the at least one slot 38 in the stationary clamp head 26 and the at least one slot 28 in the rotating clamp head 24; and rotating the rotating clamp head 24 to a position such that the at least one slot 38 in the stationary clamp head 26 and the at least one slot 28 in the rotating clamp head 24 are not in alignment.

Figure 11:
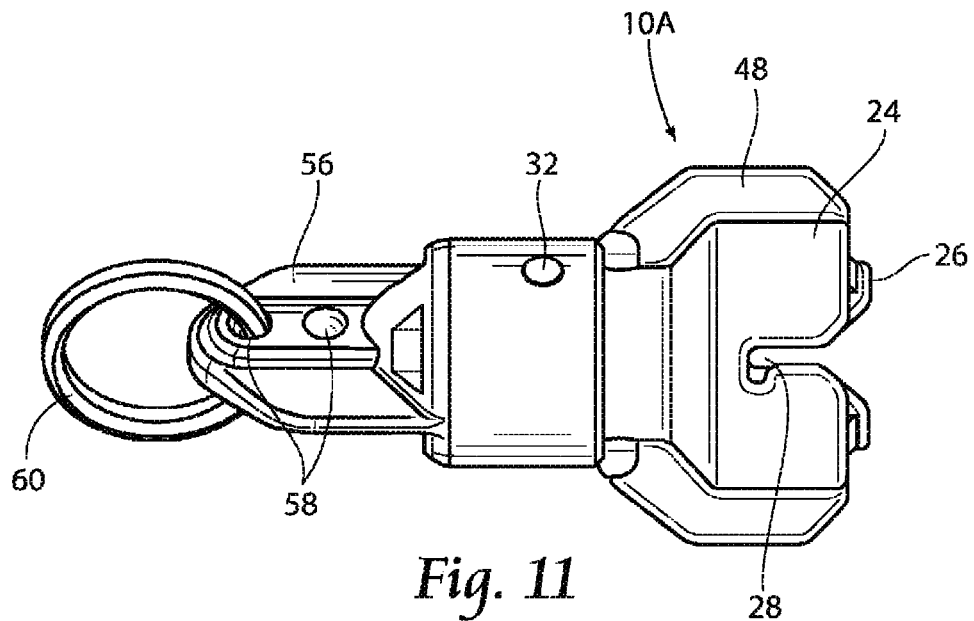
FIG. 11 is a side view of a twist clip, similar to that of FIG. 6, but showing an attachment end having a ring connector.
Figure 12:
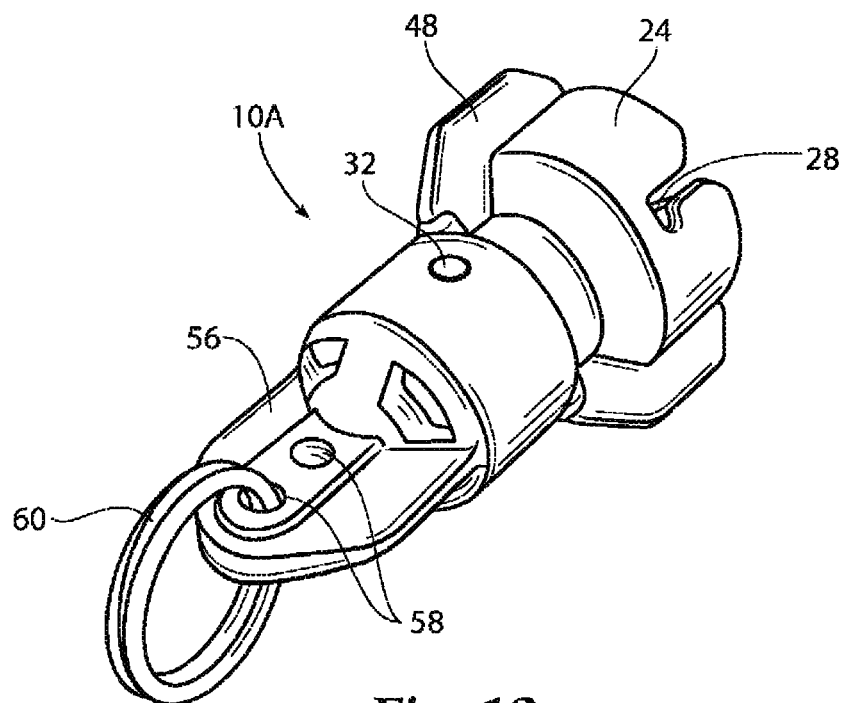
FIG. 12 is a rear perspective view of the clip illustrated in FIG. 11.

FIGS. 11 and 12 illustrate a twist clip 10A, similar to that discussed with reference to FIGS. 1-10, but showing the clip 10A having an alternative attachment end 56. In contrast to the clip described with reference to FIGS. 1-10, the clip 10A in these views includes an extending attachment end 56. As shown, the attachment end 56 may include at least one aperture 58 arranged to receive a ring connector 60 or other like device. The twist clip 10A of these view is arranged for portable use, such as for camping, bicycling, and the like.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:
1. A twist clip including
   a rotating clamp head, said rotating clamp head including at least one slot and a cam profile;
   a stationary clamp head, said rotating clamp head arranged to rotate around said stationary clamp head; and
   a core pin having a cam follower, said cam follower arranged to ride in said cam profile.
2. The twist clip of claim 1 wherein said stationary clamp head further includes at least one slot.
3. The twist clip of claim 2 wherein said at least one slot runs across a diameter of the stationary clamp head.
4. The twist clip of claim 3 wherein said at least one slot is bisected by a clearance hole, said clearance hole arranged to receive an adjustment mechanism.
5. The twist clip of claim 4 wherein said stationary clamp head is splined to said core pin.
6. The twist clip of claim 5 wherein said core pin includes a cushioned backing.
7. The twist clip of claim 6 wherein said rotating clamp head includes laterally extending flanges.
8. A method of retaining an elongate object including the steps of:
   providing a twist clip, said twist clip including a rotating clamp head and a stationary clamp head, wherein said rotating clamp head includes at least one slot and a cam profile and said stationary clamp head includes at least one slot, said rotating clamp head arranged to rotate around said stationary clamp head;
   providing an elongate object;
   positioning said stationary clamp head and said rotating clamp head in a first position wherein said at least one slot in said stationary clamp head and said at least one slot in said rotating clamp head are in alignment;
   inserting said elongate object in said at least one slot in said stationary clamp head and said at least one slot in said rotating clamp head; and
   rotating said rotating clamp head to a second position wherein said at least one slot in said stationary clamp head and said at least one slot in said rotating clamp head are not in alignment.

* * * * *